United States Patent
Jeon et al.

(10) Patent No.: US 12,340,582 B2
(45) Date of Patent: Jun. 24, 2025

(54) METHOD FOR PERCEIVING EVENT TAGGING-BASED SITUATION AND SYSTEM FOR SAME

(71) Applicant: NETVISION TELECOM, INC., Daejeon (KR)

(72) Inventors: Byung Chun Jeon, Daejeon (KR); Eui Kook Kim, Daejeon (KR); Chi Dong Han, Daejeon (KR)

(73) Assignee: NETVISION TELECOM, INC., Daejeon (KR)

( * ) Notice: Subject to any disclaimer, the term of this patent is extended or adjusted under 35 U.S.C. 154(b) by 721 days.

(21) Appl. No.: 17/624,016

(22) PCT Filed: Jul. 3, 2020

(86) PCT No.: PCT/KR2020/008709
§ 371 (c)(1),
(2) Date: Dec. 30, 2021

(87) PCT Pub. No.: WO2021/002722
PCT Pub. Date: Jan. 7, 2021

(65) Prior Publication Data
US 2022/0351515 A1  Nov. 3, 2022

(30) Foreign Application Priority Data
Jul. 4, 2019 (KR) .................. 10-2019-0080450

(51) Int. Cl.
*G06V 20/40* (2022.01)
*G06T 7/20* (2017.01)

(52) U.S. Cl.
CPC .............. *G06V 20/44* (2022.01); *G06T 7/20* (2013.01); *G06V 20/46* (2022.01)

(58) Field of Classification Search
None
See application file for complete search history.

(56) References Cited

U.S. PATENT DOCUMENTS

2019/0370980 A1* 12/2019 Hollander .............. G06V 20/41

FOREIGN PATENT DOCUMENTS

| KR | 10-1213255 B1 | 12/2012 |
|---|---|---|
| KR | 10-2015-0033402 A | 4/2015 |
| KR | 10-2016-0116842 A | 10/2016 |
| KR | 10-2017-0004350 A | 1/2017 |
| KR | 10-2017-0048108 A | 5/2017 |
| KR | 10-1877294 B1 | 7/2018 |

OTHER PUBLICATIONS

KR20180005332A english machine translation ; Inventors Jun Young Min; Yang Sun Ok; Jeon Seo Hee; Jeon Gi Ju; Publication KR101877294B1-2018-07-11 (Year: 2018).*
International Search Report of International Patent Application No. PCT/KR2020/008709, dated Oct. 15, 2020, 2 pages.
Written Opinion On Patentability of International Patent Application No. PCT/KR2020/008709, dated Oct. 15, 2020, 6 pages.

* cited by examiner

*Primary Examiner* — Nancy Bitar
(74) *Attorney, Agent, or Firm* — Christopher R. Carroll; The Small Patent Law Group LLC

(57) ABSTRACT

The present invention relates to a method for perceiving an event tagging-based situation and a system for same which recognize a plurality of objects by using camera images and apply technology for tracking the movements of the plurality of recognized objects to enable the perception of various situations.

18 Claims, 13 Drawing Sheets

(a)

(b)

METHOD FOR PERCEIVING EVENT TAGGING-BASED SITUATION AND SYSTEM FOR SAME

BACKGROUND

Technical Field

The present invention relates to a method for perceiving an event tagging-based situation and a system for the same, and more particularly, to a method for perceiving an event tagging-based situation that enables perception of various situations by detecting a plurality of objects using a camera video and applying a technology of tracking movement of the plurality of objects that are detected, and a system for the same.

Background Art

Many algorithms for object detection have been studied, and the object detection has been rapidly developed in accordance with the application of an artificial intelligence technology to the object detection. As an object detection method, there are classical methods for detecting objects using sensors such as optical sensors, pressure sensors, and depth sensors in an observation area and methods for using a machine learning technique using a support vector machine (SVM), a convolutional neural network (CNN), or the like. An artificial intelligence (AI)-based object detection technology is a technology that may be variously utilized in fields such as autonomous driving and a smart factory.

According to one of methods and systems for perceiving an object and a situation according to the related art, a method and a system for detecting an object and perceiving a situation within a monitoring area by receiving sensed depth data from an observation area using a depth sensor and analyzing the received depth data have been provided, and a method for perceiving a single situation has been suggested, but a method for perceiving complex situations has not been suggested. Accordingly, a technology capable of perceiving various complex situations based on object detection and tracking functions is required.

RELATED ART DOCUMENT

Patent Document

Korean Patent Laid-Open Publication No. 10-2017-0048108 (entitled "Method and System for Detecting Object and Situation")

DISCLOSURE

Technical Problem

An object of the present invention is to provide a method for perceiving an event tagging-based situation that enables perception of various situations by detecting a plurality of objects using a camera video and applying a technology of tracking movement of the plurality of objects that are detected, and a system for the same.

However, an object of the present invention is not limited to the above-mentioned object, and other aspects that are not mentioned may be obviously understood by those skilled in the art from the following specification.

Technical Solution

In one general aspect, a system for perceiving an event tagging-based situation includes: an object detection unit receiving a video captured by a camera or a real-time broadcasting video or reading a video stored in a storage medium to detect an object and extracting information on the object; an object tracking unit receiving the video captured by the camera or the real-time broadcasting video or reading the video stored in the storage medium, receiving the information on the object from the object detection unit, analyzing frames of the received video and tracking movement of detected objects to grasp locations of the objects, and extracting location information for each object; an event tagging unit sensing whether or not a predesignated event has occurred while the object is moving, recording event tagging information or an event tag of the object only in a case where the predesignated event has occurred, and outputting an event tag list for each object; and an action generation unit classifying events into combinations of predesignated events based on the event tagging information or the event tag list for each object received from the event tagging unit, generating an allocated action to each classified group, and outputting the action to the action execution unit.

Preferably, the object detection unit may store an image of the detected object in a separate memory or output the image of the detected object to the object tracking unit.

Preferably, the event tagging unit may receive event configuration data from an event design unit and receive the location information for each object from the object tracking unit, and may designate a line and an area for event occurrence, the line may be configured by a combination of a straight line or a curved line, and the area may be configured in a closed form by a combination of a straight line and a curved line.

Preferably, the event tagging unit may add a type of an event and an event occurrence time to object information of a generated object whenever the object passes through a point at which the event occurs.

Preferably, the predesignated event may include one or more of generation of a new object, disappearance of an object, passing through a designated line, entering a designated area, and exiting from the designated area to the outside.

Preferably, the event tag may be one or more of an ID of an event that has occurred for each object, a type of the event that has occurred, and a time value at which the event has occurred.

Preferably, the action generation unit may receive an event condition and action configuration data for perceiving a specific situation from an action definition unit and receive the event tagging information or the event tag list for each object from the event tagging unit.

Preferably, the action generation unit may use an image of the object detected by the object detection unit as one of execution items, and the execution items may include any one of storing in a specific area and transferring to a specific server.

Preferably, the system for perceiving an event tagging-based situation may further include an action execution unit receiving an action item generated by the action generation unit and performing an action or outputting a result obtained by performing the action to a display means or an external device to perform situation perception.

Preferably, the action execution unit may process an image of the detected object according to an execution item defined in the action generation unit.

Preferably, functions of the system for perceiving an event tagging-based situation may be implemented in a camera, be implemented in an edge node, or be implemented in a server or a cloud server.

Preferably, the object detection unit, the object tracking unit, and the event tagging unit may be implemented in an edge node, and the edge node may analyze a camera video signal and transfer event tagging information or an event tag list to a server or a cloud located at a remote place, and the action generation unit and the action execution unit may be implemented in the server or the cloud server, and the server or the cloud server may perform function of the action generation unit and the action execution unit based on the received event tagging information or event tag list and output a situation perception result.

Preferably, the camera may be configured to include the object detection unit and the object tracking unit, the action generation unit and the action execution unit may be implemented in a server or a cloud server, and the camera may analyze a camera video signal and transfer event tagging information or an event tag list to a server or a cloud located at a remote place, and the server or the cloud server may perform functions of the action generation unit and the action execution unit based on the received event tagging information or event tag list and output a situation perception result.

In another general aspect, a method for perceiving an event tagging-based situation includes: an object detecting step of receiving a video captured by a camera or a real-time broadcasting video or reading a video stored in a storage medium to detect an object and extracting information on the object; an object tracking step of receiving the video captured by the camera or the real-time broadcasting video or reading the video stored in the storage medium, receiving the information on the object from an object detection unit, analyzing frames of the received video and tracking movement of detected objects to grasp locations of the objects, and extracting location information for each object; an event tagging step of sensing whether or not a predesignated event has occurred while the object is moving, recording event tagging information or an event tag of the object only in a case where the predesignated event has occurred, and outputting event tagging information or an event tag list for each object; an action generating step of classifying events into combinations of predesignated events based on the event tagging information or the event tag list for each object received from an event tagging unit, generating an allocated action to each classified group, and outputting the action; and an action executing step of receiving an action from an action generation unit and executing the action.

Preferably, the event tagging unit may receive event configuration data from an event design unit and receive the location information for each object from the object tracking unit, and may designate a line and an area for event occurrence, the line may be configured by a combination of a straight line or a curved line, and the area may be configured in a closed form by a combination of a straight line and a curved line.

Preferably, the event tagging unit may add a type of an event and an event occurrence time to object information of a generated object whenever the object passes through a point at which the event occurs.

Preferably, the predesignated event may include one or more of generation of a new object, disappearance of an object, passing through a designated line, entering a designated area, and exiting from the designated area to the outside.

Preferably, the event tag may be one or more of an ID of an event that has occurred for each object, a type of the event that has occurred, and a time value at which the event has occurred.

Preferably, the action generation unit may receive an event condition and action configuration data for perceiving a specific situation from an action definition unit and receive the event tag list for each object from the event tagging unit.

In another general aspect, a method for perceiving an event tagging-based situation includes: an object detection tracking step of applying object detection and object tracking algorithms to a video received from a camera to classify object generation and object movement sections; an action defining step of setting a plurality of sections and areas in the video, defining a plurality of combinations of event occurrence groups by a user, and defining an action for each group in order to perceive a situation desired by a user according to movement of an object; and a plural-situation perceiving step of tagging a type of event for each object and an event occurrence time in order to provide perception of various situations by combinations of a type of event for each object, a sequence of event occurrence, and an elapsed time between events and performing perception of various situations by a combination of tagging information including a type of object, wherein in the action defining step, event occurrence groups are classified into the combinations of the type of event for each object, the sequence of event occurrence, and the elapsed time between events, and an action is set for each event occurrence group.

In another general aspect, a computer-readable recording medium records a program for executing the method for perceiving an event tagging-based situation described above.

Advantageous Effects

As set forth above, the present invention is a method that enables perception of various complex situations based on object detection and object tracking functions, and enables perception of various complex situations by applying existing object detection and object tracking algorithms and using event occurrence and tagging functions capable of classifying object movement sections.

The present invention provides an event occurrence structure based on a section and an area, and may designate a suitable section/area according to a camera installation location by allowing an event occurrence section and area to be set according to a video, and enables event occurrence by allowing a user to set various sections and areas.

The present invention provides perception of various situations by combinations of event combination/event sequence/elapsed time between events, tags a type of event for each object and an event occurrence time, and enables perception of various situations by a combination of tagging information including a type of object. In addition, the present invention enables perception of complex situations and application of various actions according to situations by classifying event occurrence groups by combinations of a type of event, an event occurrence sequence, and an elapsed time between events and allowing an action for each event occurrence group to be set.

The present invention has a structure in which a user setting is possible, and is user-configurable by setting various sections and areas, defining various combinations of event occurrence groups by a user, and defining an action for each group in order to perceive a situation desired by the user according to movement of an object.

BEST MODE

Figure 1:
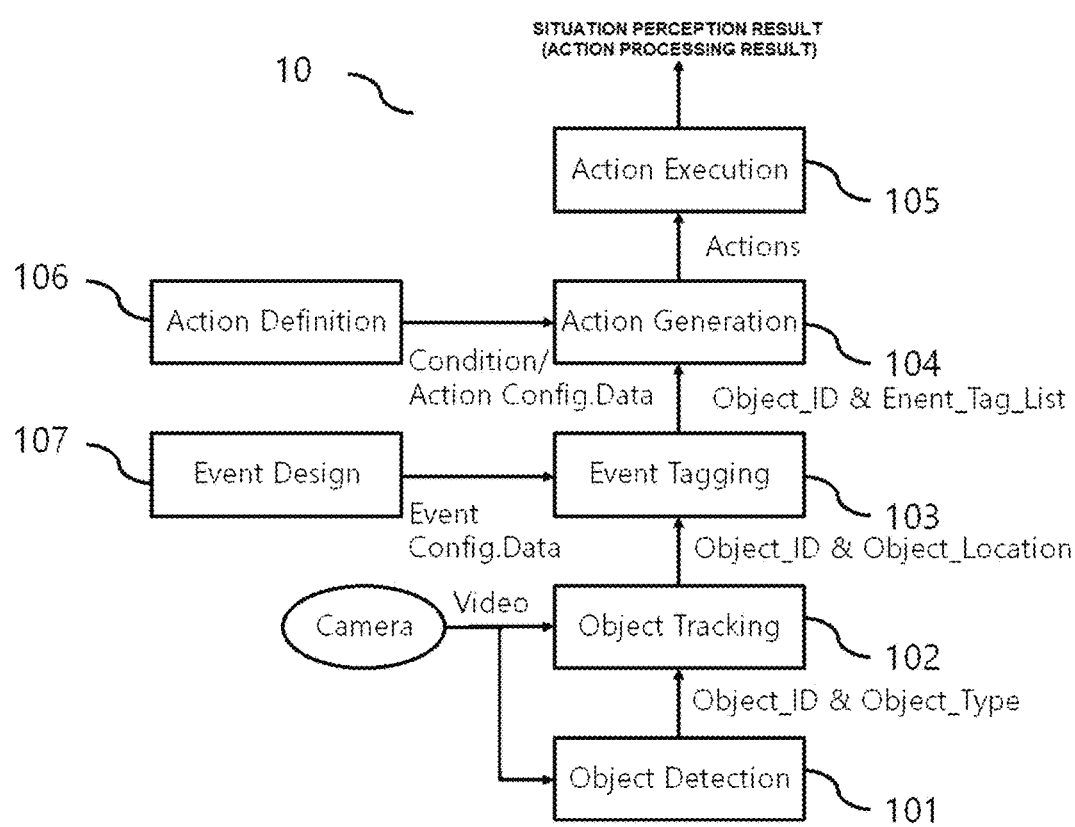
FIG. 1 is a block diagram of a system for perceiving an event tagging-based situation according to an embodiment of the present invention.

Since the present invention may be variously modified and have several embodiments, specific embodiments will be illustrated in the accompanying drawings and be described in detail in a detailed description. However, it is to be understood that the present invention is not limited to specific embodiments, and includes all modifications, equivalents, and substitutions without departing from the scope and spirit of the present invention. When it is determined that a detailed description of any known art related to the present invention may obscure the gist of the present invention, the detailed description will be omitted.

Terms used in the present specification are used only in order to describe specific embodiments rather than limiting the present invention. Singular forms are intended to include plural forms unless the context clearly indicates otherwise. It is to be understood that the terms "include" or "configured" used in the present specification specify the presence of features, numerals, steps, operations, components, parts, or combinations thereof mentioned in the present specification, or a combination thereof, and do not exclude the presence or addition of one or more other features, numerals, steps, operations, components, parts, or combinations thereof.

A method and a system for perceiving an event tagging-based situation according to the present invention enable perception of various complex situations in combination with a tracking technology for tracking movement of objects detected by an object detection function. Whenever the detected object enters and exits from a set area or passes through a set line at the time of being moved, such event information is added to the object together with a time when an event has occurred, each object is classified into a preset group based on the occurred event information, and a predefined action is performed for each group.

In addition, in the method and the system for perceiving an event tagging-based situation according to the present invention, a method and a system for perceiving an event tagging-based situation that enables perception of the following various situations by applying a technology of tracking movement of a plurality of objects that are detected are provided.

First, a device of detecting movement directions of vehicles and counting the vehicles is provided, and such a device provides perception and statistics of up/down vehicles and perception and statistics of vehicles for each lane.

Second, a classification and statistics device according to movement directions of vehicles at an intersection is provided, and such a device provides perception and statistics of straight-traveling/left-turning/right-turning vehicles in each direction at the intersection.

Third, in a case where a designated vehicle entering a specific direction at an intersection is generated, an alarm is generated. As an example, in a case where a motorcycle enters a motorway at an intersection or in a case where a truck enters a road where the truck may not enter at an intersection, an alarm is generated.

Fourth, movement paths of people are tracked, the people are classified according to each designated movement path, and a predefined action is performed for each classified group. For example, people moving from building A to building B are classified and counted, or an alarm is generated in a case where the number of people moving from building B to building C is ten or more.

The system for perceiving an event tagging-based situation according to the present invention applies object detection and object tracking algorithms to a video received from a camera to classify object generation and object movement sections. In order to perceive a situation desired by a user according to movement of an object, a plurality of sections and areas are set in the video, the user defines a plurality of combinations of event occurrence groups, and defines an action for each group. Event occurrence groups are classified into combinations of a type of event for each object, a sequence of event occurrence, and an elapsed time between events, and an action is set for each event occurrence group. In order to provide perception of various situations by the combinations of the type of event for each object, the sequence of event occurrence, and the elapsed time between events, the type of event for each object and the sequence of event occurrence are tagged, and perception of various situations is performed by a combination of tagging information including a type of object.

Hereinafter, a system for perceiving an event tagging-based situation according to the present invention will be described in detail with respect to the accompanying drawings.

FIG. 1 is a block diagram of a system for perceiving an event tagging-based situation according to an embodiment of the present invention.

A system 100 for perceiving an event tagging-based situation according to an embodiment of the present invention may be configured to include an object detection unit 101, an object tracking unit 102, an event tagging unit 103, an action generation unit 104, an action execution unit 105, an action definition unit 106, and an event design unit 107. In addition, the system 100 for perceiving an event tagging-based situation according to an embodiment of the present invention may further include a camera 110.

The object detection unit 101 receives a video captured by the camera 110 or a real-time broadcasting video through a broadcasting system or reads a video stored in a storage medium to detect an object, and provides information Object_ID and Object_Type on the object to the object tracking unit 102. The object detection unit 101 may additionally execute a function of storing an image of the detected object in a separate memory or outputting the image of the detected object to the object tracking unit 102. Object detection by an existing video processing technology or a deep learning technique is applied as it is. Object_ID refers to a unique ID allocated in order to classify an object, and Object_Type refers to a parameter (e.g., 1: person, 2: vehicle, 3: animal) indicating a type of object. A manner suitable for an application among existing object detection techniques may be applied in consideration of a real-time property of processing, processing load, accuracy, and the like.

The object tracking unit 102 performs a function of receiving the video captured by the camera 110 or the real-time broadcasting video through the broadcasting system or reading the video stored in the storage medium, receiving the information Object_ID and Object_Type on the object from the object detection unit 101, analyzing frames of the received video and tracking movement of detected objects to grasp locations of the objects, and outputting location information for each object Object_ID to the event tagging unit 103. Various existing object tracking technologies are applied as they are, and a tracking algorithm that may generate an optimal result depending on an application is applied.

The event tagging unit 103 performs a function of sensing whether or not a designated event has occurred while the object is moving, recording event tagging information or an event tag only when the event has occurred, and outputting event tagging information or an event tag list for each object to the action generation unit 104. The event tagging unit 103 receives event configuration data from the event design unit 107 in advance, and receives the location information for each object Object_ID from the object tracking unit 102. Examples of the event that may occur include generation of a new object, disappearance of an object, passing through a designated line, entering a designated area, exiting from the designated area to the outside, and the like. Examples of the event tag include Object_ID (Event_ID, Event_Type, Event_Time). Event_ID is an ID (e.g. generation/disappearance of an object and an area event) of the event that has occurred. Event_Type is a type (e.g., 1: entry/2: exit, 1: generation/2: deletion) of the event that has occurred. Event_Time is a time value at which the event has occurred.

The action generation unit 104 receives a condition and action configuration data for perceiving a specific situation from the action definition unit 106, receives the event tagging information or the event tag list for each object from the event tagging unit 103, classifies events into combinations of predesignated events based on the event tagging information or the event tag list for each object received from the event tagging unit 103, generates an allocated action to each classified group, and outputs the allocated action to the action execution unit 105. Taking the event list group as an example, Example 1 is a case where Event A, Event C, and Event D sequentially occur or Example 2 is a case where Event A and Event C sequentially occur and a time between the two events is shorter than a designated time. Taking an action as an example, Example 1 is a case of increasing counter A or Example 2 is a case of displaying an alarm on a screen (Object_ID, 'AAA alarm generation').

The image of the object detected by the object detection unit 101 may be used as one of execution items in the action generation unit 104. The execution items may be defined as 'storing in a specific area', 'transferring to a specific server', or the like.

The action execution unit 105 receives an action item generated by the action generation unit 104 and performs an action. In addition, a result obtained by performing the action is output to a display means or an external device, and a result obtained by performing a specific action item is a result for whether or not a situation is a specific situation.

The image of the detected object is processed according to the execution item defined in the action generation unit 104. The processing of the execution item will be described by way of example. First, when the detected object is detected as a traffic violation vehicle, the action execution unit stores an image of the corresponding vehicle and notifies a computer of a processing organization of the image of the corresponding vehicle. Second, when the detected object is detected as an intruder intruding in a restricted area, the action execution unit generates an alarm using an alarm means and transfers an image of the intruder to a screen of a computer of a security department. Third, when the detected object is detected as an ownerless dog discovered in the downtown plaza, the action execution unit notifies a computer of an administration center of the discovered ownerless dog along with an image.

The action definition unit 106 is a unit that defines an event combination and an action for perceiving a specific situation, and may generate a condition and action configuration data using a graphic user interface (GUI) tool. The action definition unit 106 outputs the generated condition and action configuration data to the action generation unit 104.

The event design unit 107 is a unit that designs events for generating events required for perceiving a situation and generates corresponding event setting information, and may generate event configuration data using a GUI tool.

Figure 2:
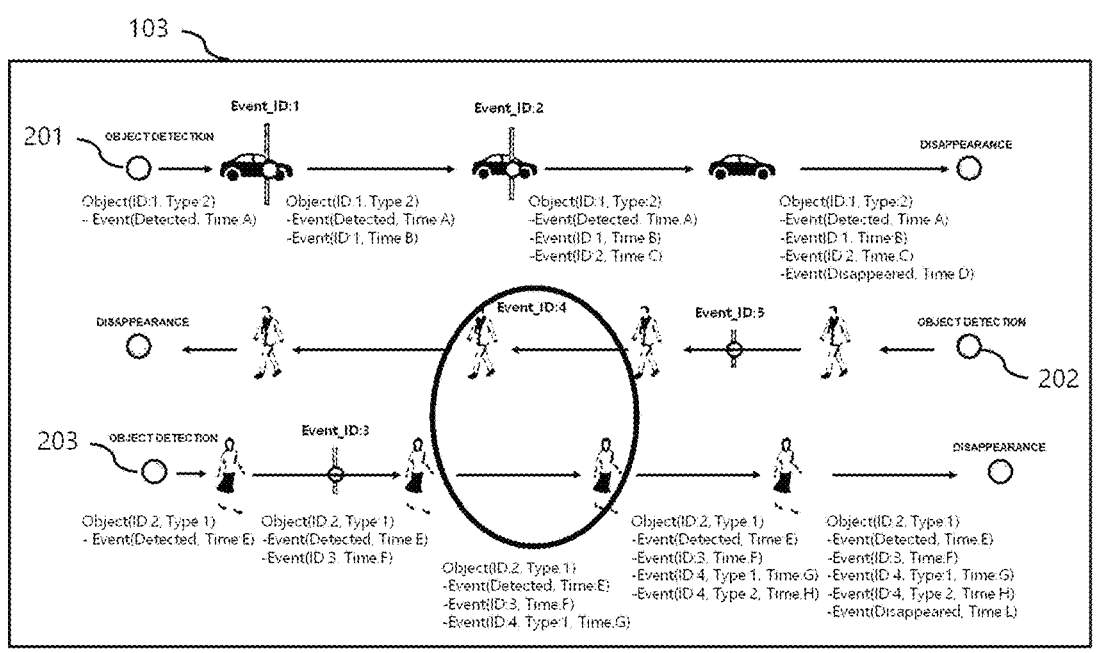
FIG. 2 illustrates an application example of an event tagging unit according to an embodiment of the present invention.

FIG. 2 illustrates an application example of an event tagging unit according to an embodiment of the present invention.

The event design unit 107 may generate the event configuration data using the GUI tool, and the user may designate a line and an area for event occurrence in the video received from the camera using the GUI tool. The line may be configured in various forms by a combination of straight lines or curved lines, and the area is configured in a closed form by a combination of straight lines and curved lines.

As illustrated in FIG. 2, whenever detected objects 201, 202, and 203 pass through points (Event_ID: 1, 2, 3, 4, 5), the event tagging unit 103 adds types of corresponding events and event occurrence times to object information of the objects. At the time of sensing the objects, not only IDs of the objects but also types (e.g., Type 1: person, Type 2: vehicle, and Type 3: animal) of the objects may be distinguished, and an event may be applied differently for each type.

A type parameter of the object may be configured in multiple stages according to an application.

(Example: people (male/female, children/youth/middle aged people/old aged people), vehicles (car/bus/truck, bus:

medium-size/large-size/ . . . ), animals (birds/mammals/fishes, birds: sparrows/doves/ . . . )

As illustrated in FIG. 2, in a case where an object called a vehicle 201 newly enters a video, the object is detected, Object(ID: 1, Type: 2) and Event(Detected, Time: A) are generated as object information, an ID of the object is 1, a type of the object is 2, which means a vehicle, the event is detected, and an event occurrence time is A. When the vehicle passes through a point of Event_ID: 1, a type (Event_ID: 1) of the event and an event occurrence time (Time: B) are added to object information of the corresponding object, such that the object information becomes Object (ID: 1, Type: 2), Event(Detected, Time: A), Event(ID: 1, Time: B). When the object continuously moves, such that the vehicle passes through a point of Event_ID: 2, a type (Event_ID: 2) of the event and an event occurrence time (Time: C) are added to object information of the corresponding object, such that the object information becomes Object (ID: 1, Type: 2), Event(Detected, Time: A), Event(ID: 1, Time: B), Event(ID: 2, Time: C). In addition, when the object continuously moves to move to an end area of the video and the corresponding object called the vehicle passes through a disappearance point, a type (Event(Disappeared)) of the event and an event occurrence time (Time: D) are added to object information of the corresponding object, such that the object information becomes Object(ID: 1, Type: 2), Event(Detected, Time: A), Event(ID: 1, Time: B), Event(ID: 2, Time: C), Event(Disappeared, Time: D).

As illustrated in FIG. 2, in a case where an object called a person (woman) 203 newly enters a video, the object is detected, Object (ID: 2, Type: 1) and Event(Detected, Time: E) are generated as object information, an ID of the object is 2, a type of the object is 1, which means a person, the event is detected, and an event occurrence time is E. When the person passes through a point of Event_ID: 3, a type (Event_ID: 3) of the event and an event occurrence time (Time: F) are added to object information of the corresponding object, such that the object information becomes Object (ID: 2, Type: 1), Event(Detected, Time: E), Event(ID: 3, Time: F). When the object continuously moves, such that the person enters an area of Event_ID: 4, a type (Event_ID: 4, Type: 1) of the event and an event occurrence time (Time: G) are added to object information of the corresponding object, such that the object information becomes Object(ID: 2, Type: 1), Event(Detected, Time: E), Event(ID:3, Time: F), Event(ID: 4, Type: 1, Time: G). Type 1 means that the person enters the area of Event_ID: 4, and Type 2 means that the person exits from the area of Event_ID: 4. When the object moves, such that the person exits from the area of Event_ID: 4, a type (Event_ID: 4, Type: 2) of the event and an event occurrence time (Time: H) are added to object information of the corresponding object, such that the object information becomes Object(ID: 2, Type: 1), Event(Detected, Time: E), Event(ID:3, Time: F), Event(ID: 4, Type: 1, Time: G), Event(ID: 4, Type: 2, Time: H). In addition, when the object continuously moves to move to an end area of the video and the corresponding object passes through a disappearance point, a type (Event(Disappeared)) of the event and an event occurrence time (Time: L) are added to object information of the corresponding object, such that the object information becomes Object(ID: 2, Type: 1), Event(Detected, Time: E), Event(ID:3, Time: F), Event(ID: 4, Type: 1, Time: G), Event(ID: 4, Type: 2, Time: H), Event(Disappeared, Time: L).

As illustrated in FIG. 2, in a case where an object called a person (man) 202 newly enters a video, the object is detected, the same procedure as the person (woman) 203 is performed, but Object (ID: 3, Type: 1) and Event(Detected, Time: M) are generated as object information, an ID of the object is 3, a type of the object is 1, which means a person, the event is detected, and an event occurrence time is M. When the person passes through a point of Event_ID: 5, a type (Event_ID: 5) of the event and an event occurrence time (Time: N) are added to object information of the corresponding object, such that the object information becomes Object (ID: 3, Type: 1), Event(Detected, Time: M), Event(ID: 5, Time: N). The object continuously moves, such that the person enters the area of Event_ID: 4, the subsequent procedures are the same as those of the person (woman) 203, and thus, a detailed description thereof will be described.

Figure 3:
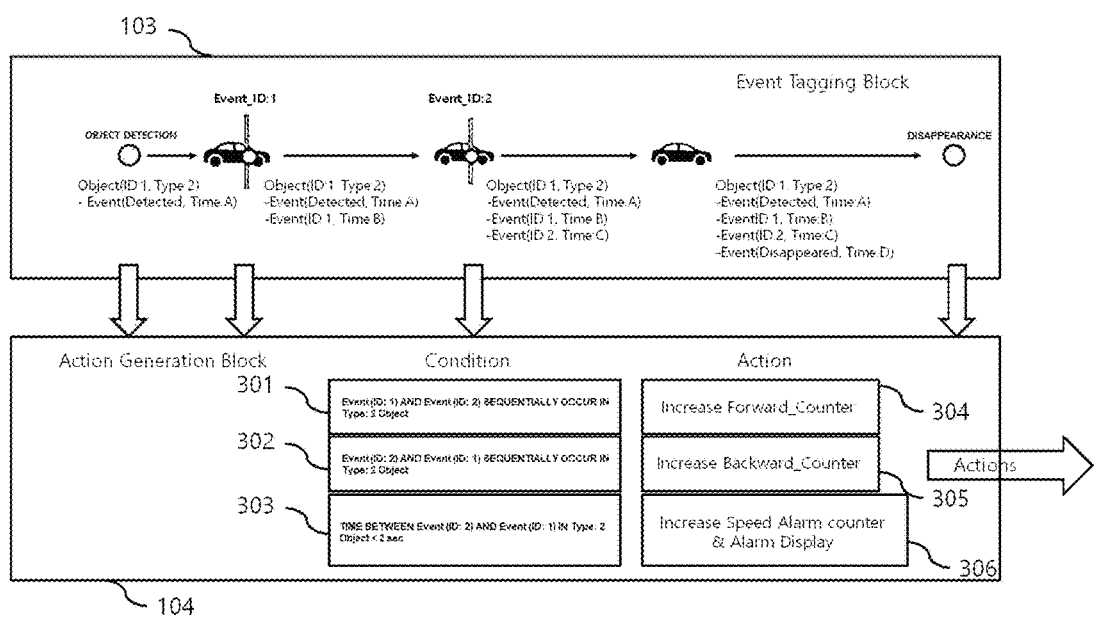
FIG. 3 illustrates an application example of an action generation unit according to an embodiment of the present invention.

FIG. 3 illustrates an application example of an action generation unit according to an embodiment of the present invention.

As illustrated in FIG. 3, the action generation unit 104 is an action generation block that defines a condition including a combination of events and allows the user to set an action corresponding to the combination. The action generation unit 104 inspects whether or not a combination of events tagged to each object meets the defined condition. In a case where the combination of events of the objects meets a specific condition, the action generation unit 104 allows the action execution unit 150 to execute an action by outputting the action to the action execution unit 105 in order to execute an action corresponding to the condition.

An application time of the action generation unit 104 to the event tagging information or the event tag list received from the event tagging unit 103 is as follows.

(1) Whenever a new event occurs in an object, inspection of event tagging information or an event tag list of the object and a corresponding action are executed. It is applied in a case where real-time processing is required, and a duplicate execution prevention function of an executed action is required.

As illustrated in FIG. 3, in a condition 301 in which Event(ID: 1) and Event(ID: 2) sequentially occur, as an action, a forward counter is increased in order to calculate the number of objects called vehicles moving in a forward direction (304, Increase Forward_Counter). In a condition 302 in which Event(ID: 2) and Event(ID: 1) sequentially occur, as an action, a backward counter is increased in order to calculate the number of objects called vehicles moving in a backward direction (305, Increase Forward_Counter). Each of the numbers of vehicles moving in a forward direction and a backward direction is counted by a combination of Event_ID: 1 and Event_ID: 2, overspeed vehicles are sensed by a time between the two events, and alarm display and counting (Alarm_Counter) are performed. For example, in a condition 303 in which the time between Event (ID: 2) and Event (ID: 1) is less than 2 seconds (<2 sec), as an action, the overspeed vehicles are sensed by the time between the two events, and the alarm display and counting are performed (306, Increase Speed Alarm counter & Alarm Display).

(2) At a point in time when an object disappears, inspection of event tagging information or an event tag list of the object and a corresponding action are executed. It is applied in a case where real-time processing is not required.

(3) Only in a case where a designated specific event occurs, inspection of event tagging information or an event tag list of the object and a corresponding action are executed. Real-time processing may be performed, and a processing load of the action generation unit may be decreased.

Figure 4:
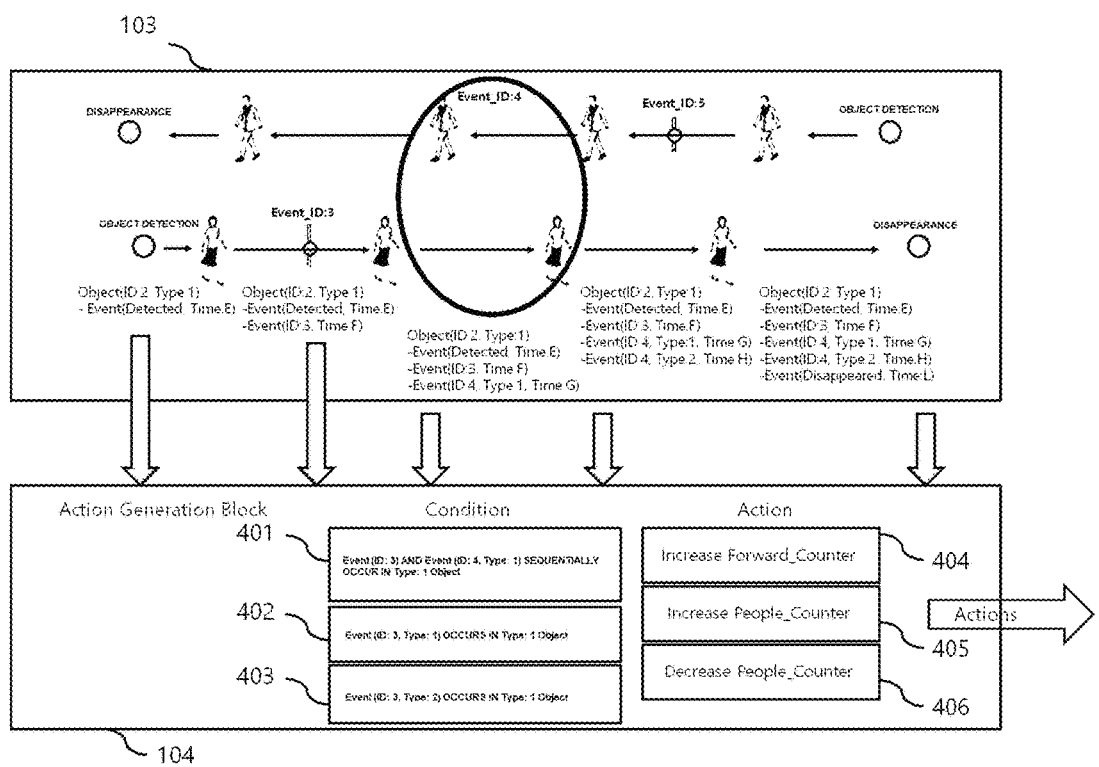
FIG. 4 illustrates another application example of the action generation unit according to an embodiment of the present invention.

FIG. 4 illustrates another application example of the action generation unit according to an embodiment of the present invention. As a feature of the action generation unit, different combinations of conditions may be defined depending on a type of object (Object_Type). As an example, different types of situation perception conditions are defined for a vehicle and a person.

As illustrated in FIG. 4, in a condition 401 in which Event(ID: 3) and Event(ID: 4, Type: 1) sequentially occur, as an action, people who have moved from a region of Event_ID: 3 to an area of Event_ID: 4 with respect to an object called a person are counted (404, Increase Forward_Counter). In a condition 402 in which Event(ID: 4, Type: 1) occurs, the number of people entering the area of Event_ID: 4 from the region of Event_ID: 3 and staying in the area of Event_ID: 4 is increased (405, Increase People_Counter). In a condition 403 in which Event(ID: 4, Type: 2) occurs, the number of people staying in the area of Event_ID: 4 among people moving from the region of Event_ID: 3 to the area of Event_ID: 4 is decreased (406, Decrease People_Counter). The condition 402 in which Event(ID: 4, Type: 1) occurs and the condition 403 in which Event(ID: 4, Type: 2) occurs are combined with each other to display the number of people staying in the area of Event_ID: 4 among people moving from the region of Event_ID: 3 to the area of Event_ID: 4 (People_Counter).

Figure 5:
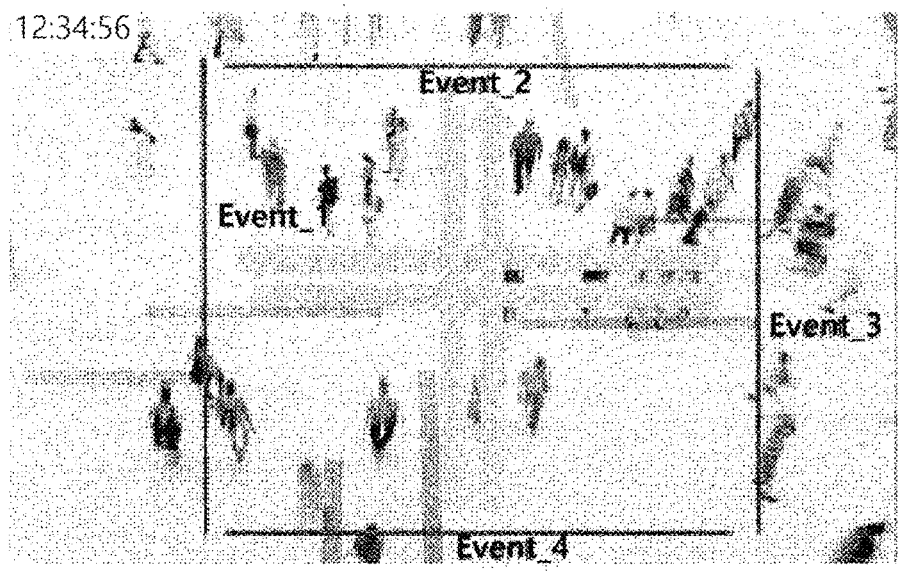
FIG. 5 illustrates an application example of situation perception of the system for perceiving an event tagging-based situation according to an embodiment of the present invention.
Figure 5:
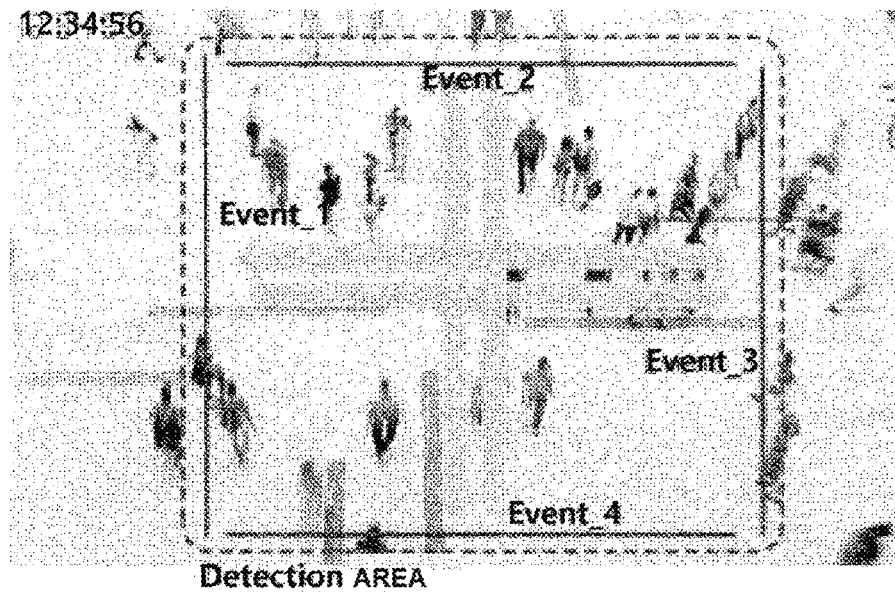

FIG. 5 illustrates an application example of situation perception of the system for perceiving an event tagging-based situation according to an embodiment of the present invention.

As illustrated in FIG. 5A, in order to provide statistics on movement directions of people, statistical information for each movement direction of people is collected for each event that has occurred. First, object detection is performed. Through this, the total number of people who have passed this section and the number of sensed people per time period are calculated. In addition, when Event 1 and Event 3 sequentially occur (Event_1 to Event_3), people are detected as people who have moved from the left to the right and the number of such people who have moved from the left to the right is calculated, and when Event 3 and Event 1 sequentially occur (Event_3 to Event_1), people are detected as people who have moved from the right to the left and the number of people who have moved from the right to the left is calculated. When Event 2 and Event 4 sequentially occur (Event_2 to Event_4), people are detected as people who have moved from the top to the bottom and the number of people who have moved from the top to the bottom is calculated, and when Event 4 and Event 2 sequentially occur (Event_4 to Event_2), people are detected as people who have moved from the bottom to the top and the number of people who have moved from the bottom to the top is calculated. In addition, the number of people who have moved to an oblique line may be counted by applying another combination, and when Event 2 and Event 3 sequentially occur (Event_2 to Event 3), people are detected as people who have moved from the top to the right and the number of people who have moved from the top to the right is calculated.

FIG. 5B further illustrates an object detection area in FIG. 5A. FIG. 5B illustrates performing situation perception in a state in which an object detection area is further included, in addition to the application of the situation perception of the system for perceiving an event tagging-based situation of FIG. 5A. As illustrated in FIG. 5B, in a case where the object detection area is designated, only objects in the object detection area are detected. Through this, it is possible to collect statistical information on the number of people in the object detection area, and it is possible to measure a degree of congestion at a specific point.

Figure 6:
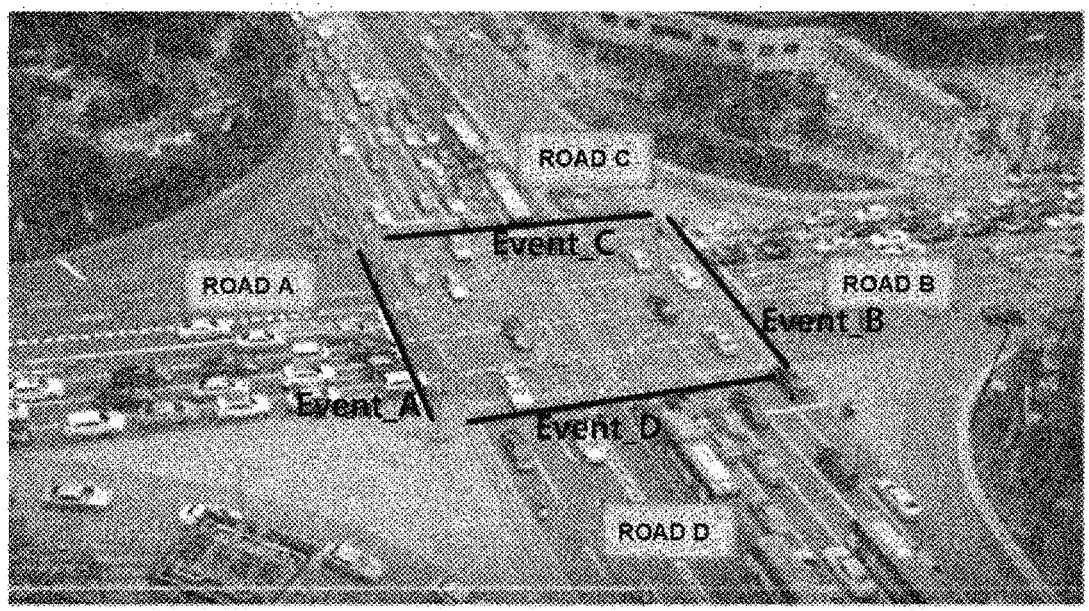
FIG. 6 illustrates another application example of situation perception of the system for perceiving an event tagging-based situation according to an embodiment of the present invention.

FIG. 6 illustrates another application example of situation perception of the system for perceiving an event tagging-based situation according to an embodiment of the present invention.

As illustrated in FIG. 6, the number of vehicles moving in each direction at a crossroads is counted. First, When Event A and Event B sequentially occur (Event_A & Event_B), vehicles are detected as straight-traveling vehicles on road A, and the number of straight-traveling vehicles on road A is calculated. When Event A and Event C sequentially occur (Event_A & Event_C), vehicles are detected as left-turning vehicles on road A, and the number of left-turning vehicles on road A is calculated. When Event B and Event A sequentially occur (Event_B & Event_A), vehicles are detected as straight-traveling vehicles on road B, and the number of straight-traveling vehicles on road B is calculated. When Event B and Event D sequentially occur (Event_B & Event_D), vehicles are detected as left-turning vehicles on road B, and the number of left-turning vehicles on road B is calculated. When Event C and Event D sequentially occur (Event_C & Event_D), vehicles are detected as straight-traveling vehicles on road C, and the number of straight-traveling vehicles on road C is calculated. When Event C and Event B sequentially occur (Event_C & Event_B), vehicles are detected as left-turning vehicles on road C, and the number of left-turning vehicles on road C is calculated. When Event D and Event C sequentially occur (Event_D & Event_C), vehicles are detected as straight-traveling vehicles on road D, and the number of straight-traveling vehicles on road D is calculated. When Event D and Event A sequentially occur (Event_D & Event_A), vehicles are detected as left-turning vehicles on road D, and the number of left-turning vehicles on road D is calculated. In addition, it is possible to obtain statistical information on various conditions through various combinations of events in addition to the combinations described above.

Figure 7:
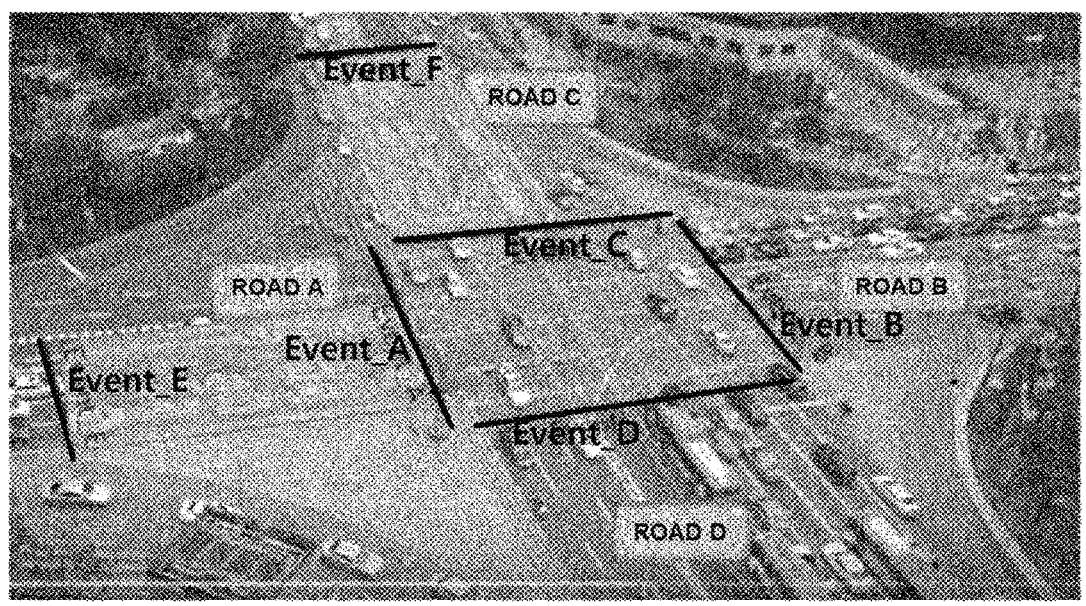
FIG. 7 additionally illustrates events for measuring the number of waiting vehicles in FIG. 6.

FIG. 7 additionally illustrates events for measuring the number of waiting vehicles in FIG. 6. FIG. 7 illustrates performing situation perception in a state in which events for measuring the number of waiting vehicles are included in addition to the application of the situation perception of the system for perceiving an event tagging-based situation of FIG. 6. As illustrated in FIG. 7, in order to calculate the number of vehicles waiting on road A, the number of vehicles for which Event_A has not yet occurred after Event E has occurred is counted. In order to calculate the number of vehicles waiting on road C, the number of vehicles for which Event_C has not yet occurred after Event F has occurred is counted. Through this, it is possible to measure the number of vehicles waiting at a crossroads.

Figure 8:
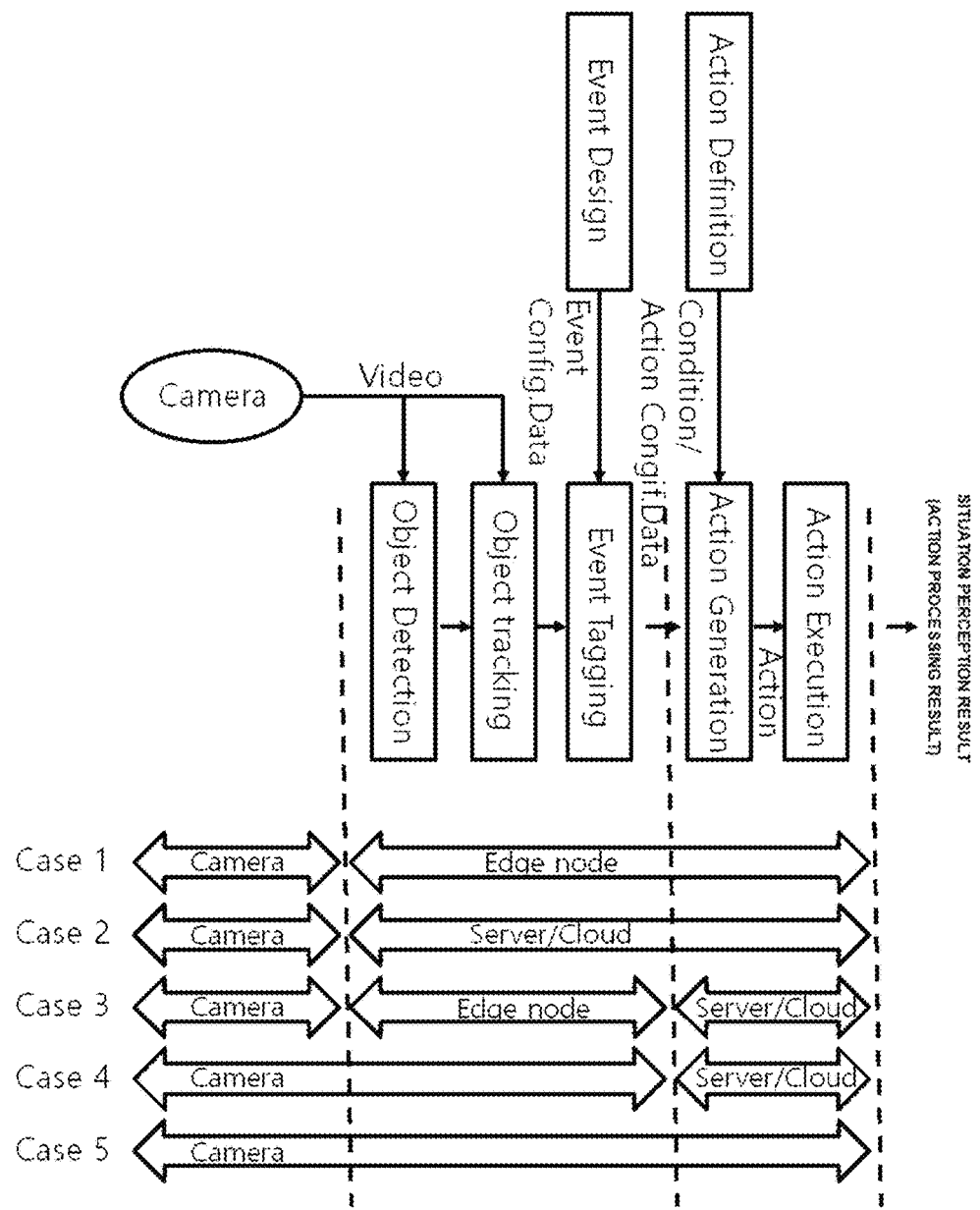
FIG. 8 is a diagram illustrating several hardware structures according to an implementation method of the system for perceiving an event tagging-based situation according to an embodiment of the present invention.

FIG. 8 is a diagram illustrating several hardware structures according to an implementation method of the system for perceiving an event tagging-based situation according to an embodiment of the present invention.

As illustrated in FIG. 8, a total of five cases may be divided according to devices that implement the object detection unit 101, the object tracking unit 102, the event tagging unit 103, the action generation unit 104, the action execution unit 105, the action definition unit 106, the event design unit 107, and the camera 110, which are components of the system for perceiving an event tagging-based situation according to an embodiment of the present invention. These devices include a camera device, an edge node, and a server/cloud. The following Table 1 illustrates configuration examples of devices to which functions constituting the system for perceiving an event tagging-based situation according to the present invention are applied.

105 based on the event tagging information to generate a situation perception result. Since the camera transfers only event tagging information instead of the video data, an amount of transmitted data may be significantly decreased and a server or cloud load may be decreased.

In Case 5, all functions required for situational perception are integrated in the camera. Since the camera outputs only a situation perception result, it is possible to obtain the situation perception result without a server for a separate video analysis processing function.

TABLE 1

| Application Case | Hardware configuration method | Description |
| --- | --- | --- |
| Case 1 | Camera: camera function<br>Edge node: object detection unit 101, object tracking unit 102, event tagging unit 103, action generation unit 104, action execution unit 105, action definition unit 106, event design unit 107 | Edge node performs all functions 101 to 107 of system |
| Case 2 | Camera: camera function<br>Server/Cloud: object detection unit 101, object tracking unit 102, event tagging unit 103, action generation unit 104, action execution unit 105, action definition unit 106, event design unit 107 | Server/Cloud performs all functions 101 to 107 of system |
| Case 3 | Camera: camera function<br>Edge node: object detection unit 101, object tracking unit 102, event tagging unit 103, event design unit 107<br>Server/Cloud: action generation unit 104, action execution unit 105, action definition unit 106 | Edge node and Server/Cloud are in charge of some of functions of system |
| Case 4 | Camera: camera function, object detection unit 101, object tracking unit 102, event tagging unit 103, event design unit 107<br>Server/Cloud: action generation unit 104, action execution unit 105, action definition unit 106 | Camera is in charge of some of functions of system in addition to camera function |
| Case 5 | Camera: camera function, object detection unit 101, object tracking unit 102, event tagging unit 103, action generation unit 104, action execution unit 105, action definition unit 106, event design unit 107 | Camera is in charge of all functions of system |

Configurations of devices to which functions constituting the system according to the present invention are applied will be described below with reference to FIG. 8 and Table 1.

In Case 1, a separate general camera is connected to an edge node. The edge node analyzes a camera video signal and outputs a situation perception result.

In Case 2, a general-purpose server or a cloud server located at a remote place processes a camera video data and outputs a situation perception result.

In Case 3, a separate general camera is connected to an edge node. The edge node analyzes a camera video signal and transfers event tagging information (or an event tag list) to a server or a cloud located at a remote place. The server or the cloud (server) performs functions of the action generation unit 104 and the action execution unit 105 based on the event tagging information to generate a situation perception result. The camera video is transferred only to an adjacent edge node, and since the edge node transfers only the event tagging information to the server or the cloud, an amount of transmitted data may be significantly decreased and a server or cloud load may be decreased.

In Case 4, functions of the object detection unit 101 and the object tracking unit 102 are integrated in addition to a camera function in the camera. The camera transfers only event tagging information to a server or a cloud located at a remote place. The server or the cloud performs functions of the action generation unit 104 and the action execution unit As illustrated in FIG. 8, the system for perceiving an event tagging-based situation according to an embodiment of the present invention may have several hardware structures according to an implementation method. Hereinafter, a system to which the system for perceiving an event tagging-based situation according to an embodiment of the present invention may be applied will be described with reference to FIGS. 9 to 11.

Figure 9:
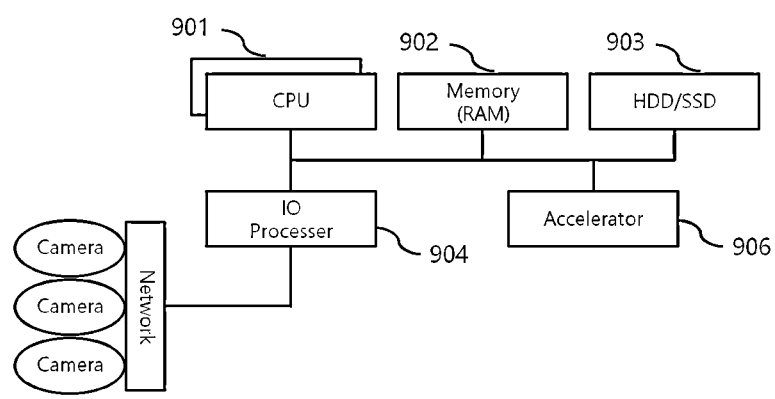
FIG. 9 is a block diagram of a Case 2 server/cloud in FIG. 8.

FIG. 9 is a block diagram of a server/cloud of Case 2 in FIG. 8. As illustrated in FIG. 9, the server/cloud of Case 2 may be implemented as a server system that receives video signals (video streams) from a plurality of cameras, receives real-time broadcasting signals (video streams) through a broadcasting system, or reads video signals (video streams) stored in a storage medium and processes situation perception. The server/cloud of Case 2 may operate as a server system that receives Internet protocol (IP)-based video traffics from a plurality of cameras and processes situation perception or may operate as a server system that reads a plurality of video signals from a storage server rather than the cameras and processes the plurality of video signals at a high speed.

As illustrated in FIG. 9, the server/cloud of Case 2 may be configured to include a control unit (central processing unit (CPU)) 901, a memory (random access memory (RAM)) 902, a storing unit 903, an IO processor 904, and an accelerator board 905. A graphic processor unit (GPU) may be used instead of the accelerator board 905. The IO processor 904 receives a video signal from the camera, carried in an IP packet through Ethernet, and an open network video interface forum (ONVIF) standard may be used as a communication protocol. The control unit (CPU) 901 receives the video signal through the IO processor 904, and performs video processing for object detection, tracking, and situation perception using the video signal. The control unit 901 uses one or a plurality of graphic processor units (GPUs) or accelerator boards mounted in order to rapidly sense an object. The accelerator board 905 may be a board in which a field programmable gate array (FPGA) or a dedicated artificial intelligence (AI) processing chip is embedded. The memory 902 temporarily stores data required for processing of the control unit, and the RAM may be used as the memory 902. The storage unit 903 is a hard disk drive (HDD) or a solid state drive (SSD), and includes a video stream, a computer program performing a method for perceiving a situation, data required for performing the method for perceiving a situation, and performance result data. The graphic processor unit (GPU) or the accelerator board performs a function for sensing an object under the control of the control unit 901, and one or a plurality of graphic processor unit (GPU) or accelerator boards are used in order to rapidly sense the object.

A block diagram of servers/clouds of Cases 3/4 in FIG. 8 will be described below. As illustrated in FIG. 8, the servers/clouds of Cases 3/4 may be implemented as a server system that receives one or a plurality of video signal event tagging information and processes situation perception. The servers/clouds of Cases 3/4 receive event tagging information from one or a plurality of edge nodes or cameras in which object detection/tracking functions are embedded through a communication network and perform situation perception processing (since a video signal having a large bandwidth is not transferred, the servers/clouds may be connected to the edge nodes or the cameras through mobile/wireless networks, and a processing load of the server/cloud may be significantly decreased).

Figure 10:
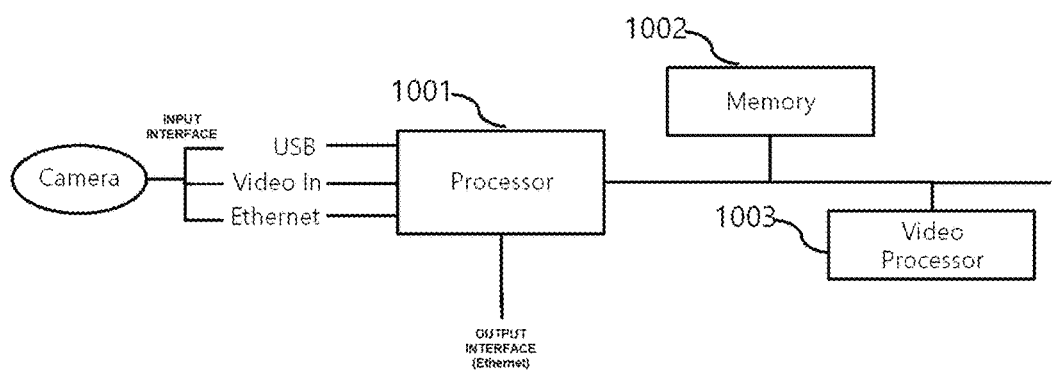
FIG. 10 is a block diagram of a Case 1/3 edge node in FIG. 8.

FIG. 10 is a block diagram of edge nodes of Cases 1/3 in FIG. 8. As illustrated in FIG. 10, the edge nodes of Case 1 and Case 3 may be configured to include a control unit 1001, a memory 1002, and a video processor 1003.

As illustrated in FIG. 10, the edge nodes may be implemented as an edge node system that processes video signals from one or a plurality of cameras. A processor, which is the control unit 1001, may be implemented as a system on chip (SoC) or a general-purpose CPU, and receives the video signal from the camera through a universal serial bus (USB), Ethernet, and a video input interface of the control unit 1001. The video processor 1003 is used in order to sense an object at a high speed under the control of the control unit 1001, and includes a neural network chip, a Tensorflow processor unit, and the like. The edge nodes of Cases 1 and 3 are a system that outputs event tagging information (edge node of Case 3) or outputs a situation perception result (edge node of Case 1). The edge nodes of Cases 1 and 3 may input and process video data (Internet protocol-based video traffic) through Ethernet using an existing IP camera, may receive a video signal through a USB or an existing video input interface instead of the Ethernet interface, or may read and process a video traffic from a storage medium other than the camera.

The memory 1002 may temporarily store data required for processing of the control unit, and may include a video stream, a computer program performing a method for perceiving a situation, data required for performing the method for perceiving a situation, and performance result data.

Figure 11:
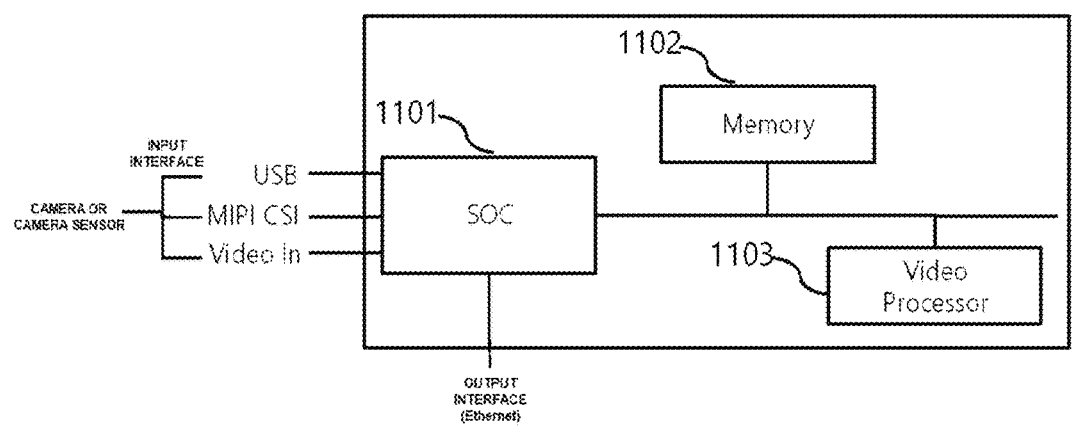
FIG. 11 is a block diagram of a Case 4/5 camera in FIG. 8.

FIG. 11 is a block diagram of cameras of Cases 4/5 in FIG. 8. As illustrated in FIG. 11, the cameras of Cases 4 and 5 may be configured to include a control unit 1101, a memory 1102, and a video processor 1103 in addition to a camera sensor or a camera module. A camera is classified into cameras of Case 4/Case 5 according to whether or not to perform action generation/execution functions. The camera of Case 4 is a camera that integrates object detection/tracking functions and outputs event tagging information extracted from a video traffic input from a camera sensor, and the camera of Case 5 is a camera that integrates all functions required for situation perception and outputs a situation perception result.

The control unit 1101 may be implemented as a system on chip (SoC), and a dedicated or general-purpose mobile device SoC for video signal processing may be used as the control unit. A camera sensor or a camera module is connected to a mobile industry processor interface camera sensor interface (MIPI CSI), a USB, or a video input interface to receive a video signal. The video processor 1103 may be selectively used in order to sense an object at a high speed under the control of the control unit 1101, and a camera module may be directly connected to an MIPI interface of the video processor 1103 to perform an object detection function.

The memory 1102 may temporarily store data required for processing of the control unit, and may include a video stream, a computer program performing a method for perceiving a situation, data required for performing the method for perceiving a situation, and performance result data.

Figure 12:
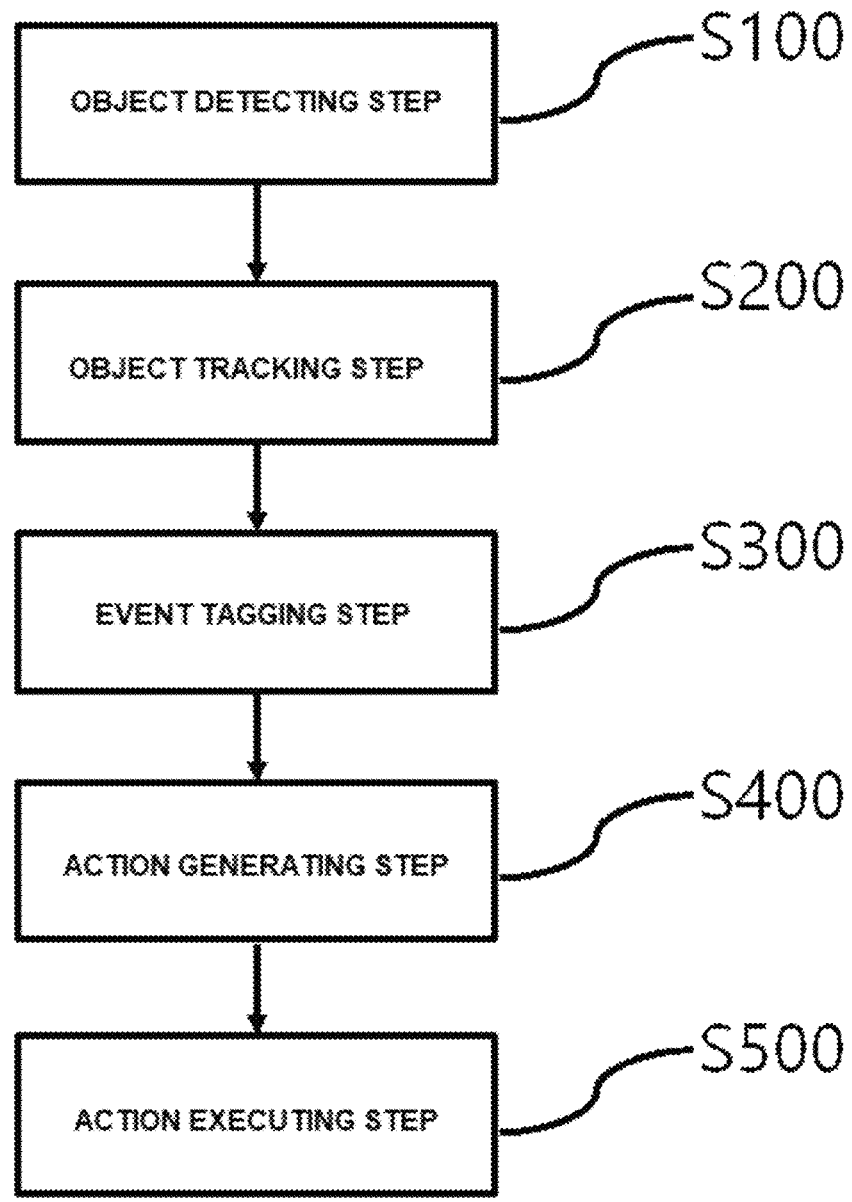
FIG. 12 is a flowchart illustrating an example of a method for perceiving an event tagging-based situation of a system for perceiving an event tagging-based situation according to another embodiment of the present invention.

FIG. 12 is a flowchart illustrating an example of a method for perceiving an event tagging-based situation of a system for perceiving an event tagging-based situation according to another embodiment of the present invention.

As illustrated in FIG. 12, the method for perceiving an event tagging-based situation according to another embodiment of the present invention is configured to include an object detecting step S100, an object tracking step S200, an event tagging step S300, an action generating step S400, and an action executing step S500.

The object detecting step S100 is a step of receiving a video captured by a camera to detect an object and extracting information on the object. In addition to the reception of the video captured by the camera 110, a real-time broadcasting video may be received through a terrestrial broadcasting, cable broadcasting, or satellite broadcasting system to detect an object or a video stored in a storage medium may be read to detect an object.

The object tracking step S200 is a step of receiving the video captured by the camera 110 or receiving the real-time broadcasting video through the broadcasting system or reading the video stored in the storage medium, receiving information on the object from the object detection unit, analyzing frames of the received video and tracking movement of detected objects to grasp locations of the objects, and extracting location information for each object.

The event tagging step S300 is a step of sensing whether or not a predesignated event has occurred while the object is moving, recording event tagging information or an event tag only when the event has occurred, and outputting event tagging information or an event tag list for each object. The predesignated event includes one or more of generation of a new object, disappearance of an object, passing through a designated line, entering a designated area, and exiting from the designated area to the outside. The event tag includes one or more of an ID of an event that has occurred for each object, a type of the event that has occurred, and a time value at which the event has occurred.

The action generating step S400 is a step of classifying events into combinations of predesignated events based on the event tagging information or the event tag list for each object received from the event tagging unit, generating an allocated action to each classified group, and outputting the action. The event tagging unit receives event configuration data from the event design unit, receives the location information for each object from the object tracking unit, and designates a line and an area for event occurrence, the line may be configured by a combination of a straight line or a curved line, and the area is configured in a closed form by a combination of a straight line and a curved line. The event tagging unit adds a type of an event and an event occurrence time to the object information of a generated object whenever the object passes through a point at which the event occurs.

The action executing step S500 is a step of receiving an action from the action generation unit and executing the action. The action generation unit receives an event condition and action configuration data for perceiving a specific situation from the action definition unit, and receives the event tagging information or the event tag list for each object from the event tagging unit.

Figure 13:
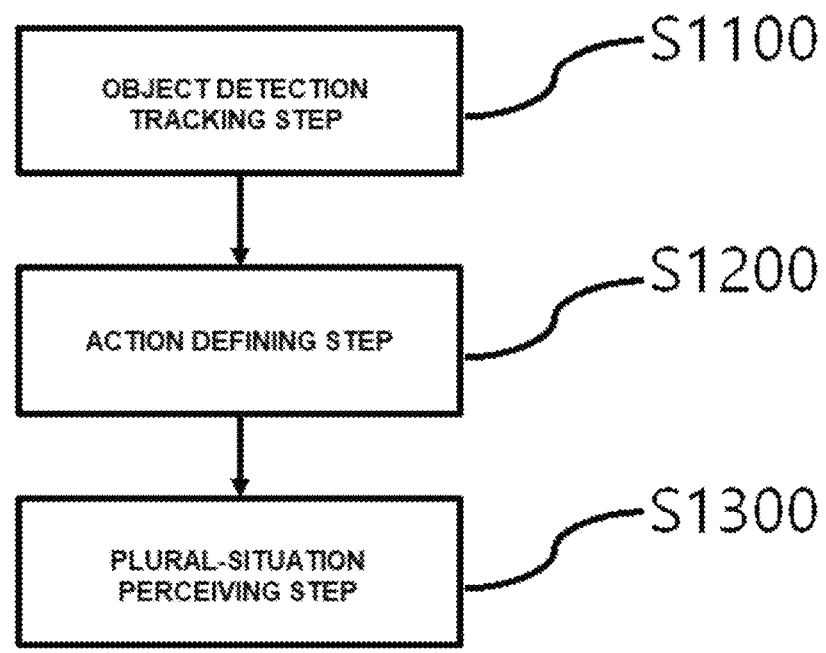
FIG. 13 is a flowchart illustrating another example of a method for perceiving an event tagging-based situation of a system for perceiving an event tagging-based situation according to another embodiment of the present invention.

FIG. 13 is a flowchart illustrating another example of a method for perceiving an event tagging-based situation of a system for perceiving an event tagging-based situation according to another embodiment of the present invention.

As illustrated in FIG. 13, the method for perceiving an event tagging-based situation according to another embodiment of the present invention is configured to include an object detection tracking step S1100, an action defining step S1200, and a plural-situation perceiving step S1300.

In the object detection tracking step S1100, a video captured by the camera 110 is received, a real-time broadcasting video is received through a broadcasting system, or a video stored in a storage medium is read, and object detection and object tracking algorithms are applied to the video to classify object generation and object movement sections.

In the action defining step S1200, in order to perceive a situation desired by a user according to movement of an object, a plurality of sections and areas are set in the video, the user defines a plurality of combinations of event occurrence groups, and defines an action for each group. In the action defining step S1200, event occurrence groups are classified into combinations of a type of event for each object, a sequence of event occurrence, and an elapsed time between events, and an action is set for each event occurrence group.

In the plural-situation perceiving step S1300, the type of event for each object and the event occurrence time are tagged in order to provide perception of various situations by the combinations of the type of event for each object, the sequence of event occurrence, and the elapsed time between events, and perception of various situations is performed by a combination of tagging information including a type of object.

Meanwhile, the method for perceiving an event tagging-based situation according to an embodiment of the present invention may be implemented in a form of program commands that may be executed through various means capable of electronically processing information, and may be recorded in a storage medium. The storage medium may include program commands, data files, data structures, or the like, alone or a combination thereof.

The program commands recorded in the storage medium may be especially designed and constituted for the present invention or be known to those skilled in a software field. Examples of the storage medium include a magnetic medium such as a hard disk, a floppy disk, and a magnetic tape; an optical recording medium such as a compact disk read only memory (CD-ROM) and a digital versatile disk (DVD); a magneto-optical medium such as a floptical disk; and a hardware device specially configured to store and perform program commands, such as a ROM, a random access memory (RAM), a flash memory, or the like. Examples of the program commands include a high-level language code capable of being executed by an apparatus electronically processing information using an interpreter, or the like, for example, a computer, as well as a machine language code made by a compiler.

Although embodiments of the present invention have been disclosed hereinabove, it may be understood by those skilled in the art that the present invention may be variously modified and altered without departing from the scope and spirit of the present invention described in the following claims.

The invention claimed is:

1. A system for perceiving an event tagging-based situation, comprising:
    an object detection unit receiving a video captured by a camera, receiving a real-time broadcasting video, or reading a video stored in a storage medium to detect multiple objects, and for each of the objects that is detected, the object detection unit sets an object identification (ID) for distinguishing the object and a type parameter of the object for applying events;
    an object tracking unit receiving the video captured by the camera, receiving the real-time broadcasting video, or reading the video stored in the storage medium, the object tracking unit receiving the object ID and the type parameter for each of the objects from the object detection unit, the object tracking unit analyzing frames of the video that is received, the real-time broadcasting video that is received, or the video that is read, the object tracking unit tracking movement of the objects that are detected to determine locations of the objects, and extracting location information for each of the objects;
    an event tagging unit, based on the location information for each of the at least one object received from the object tracking unit, sensing whether a predesignated event of the events has occurred while the objects are moving, recording event tagging information or an event tag of the objects only in a case where a predesignated specific event has occurred, and outputting an event tag list for each of the objects;
    an action generation unit classifying a combination of events tagged according to each of the objects into groups according to event conditions for recognizing a specific situation specified in advance based on the object-specific event tagging information or the tagged event list received from the event tagging unit, generating an action assigned to each combination of the classified tagged events, and outputting the action to an action execution unit; and
    an action execution unit receiving the allocated action generated by the action generated unit and performing the allocated action or displaying a result of the allocated action on a display means or an external device, thereby performing complex situation recognition for the objects.

2. The system for perceiving the event tagging-based situation of claim 1, wherein the object detection unit stores an image of the objects that are detected in a separate memory or outputs the image of the objects that are detected to the object tracking unit.

3. The system for perceiving the event tagging-based situation of claim 1, wherein the event tagging unit receives event configuration data from an event design unit and receives the location information for each of the objects from the object tracking unit, and designates a line and an area for event occurrence, the line is configured by a first combination of a straight line or a curved line, and the area is configured in a closed form by a second combination of the straight line and the curved line.

4. The system for perceiving the event tagging-based situation of claim 3, wherein the event tagging unit adds an event type and an event occurrence time to object information of a generated object whenever the objects pass through a point at which the predesignated specific event occurs.

5. The system for perceiving the event tagging-based situation of claim 1, wherein the predesignated event includes one or more of generation of a new object, disappearance of at least one of the objects, passing through a designated line, entering a designated area, and exiting from the designated area to an outside of the designated area.

6. The system for perceiving the event tagging-based situation of claim 1, wherein the event tag is one or more of an event identification that has occurred for each of the objects, a type of the event that has occurred, and a time value at which the event has occurred.

7. The system for perceiving the event tagging-based situation of claim 1, wherein the action generation unit receives an event condition and action configuration data for perceiving a specific situation from an action definition unit and receives the event tagging information or the event tag list for each of the objects from the event tagging unit.

8. The system for perceiving the event tagging-based situation of claim 7, wherein the action generation unit uses an image of the objects detected by the object detection unit as one of execution items, and the execution items include one or more of storing in a specific area or transferring to a specific server.

9. The system for perceiving the event tagging-based situation of claim 1, wherein the action execution unit processes an image of the objects that are detected according to an execution item defined in the action generation unit.

10. The system for perceiving the event tagging-based situation of claim 1, wherein functions of the system for perceiving the event tagging-based situation are implemented in the camera, are implemented in an edge node, or are implemented in a server or a cloud server.

11. The system for perceiving the event tagging-based situation of claim 1, wherein the object detection unit, the object tracking unit, and the event tagging unit are implemented in an edge node, and the edge node analyzes a camera video signal and transfers event tagging information or an event tag list to a server or a cloud located at a remote place, and the action generation unit and the action execution unit are implemented in the server or the cloud server, and the server or the cloud server performs functions of the action generation unit and the action execution unit based on the received event tagging information or event tag list and outputs a situation perception result.

12. The system for perceiving the event tagging-based situation of claim 1, wherein the camera is configured to include the object detection unit and the object tracking unit, the action generation unit and the action execution unit are implemented in a server or a cloud server, and the camera analyzes a camera video signal and transfers event tagging information or an event tag list to the server or the cloud located at a remote place, and the server or the cloud server performs functions of the action generation unit and the action execution unit based on the received event tagging information or event tag list and outputs a situation perception result.

13. A method for perceiving an event tagging-based situation, comprising:

an object detecting step of receiving a video captured by a camera or a real-time broadcasting video or reading a video stored in a storage medium to detect objects, and for each of the objects that is detected, setting an object identification (ID) for distinguishing the object and a type parameter of the object for applying events;

an object tracking step of receiving the video captured by the camera or the real-time broadcasting video or reading the video stored in the storage medium, receiving the object ID and the type parameter for each of the objects from an object detection unit, analyzing frames of the received video and tracking movement of the objects that are detected to determine locations of the objects, and extracting location information for each of the objects;

an event tagging step of using the location information for each of the objects that is extracted in the object tracking step, sensing whether or not a predesignated event of the events has occurred while the objects are moving, recording event tagging information or an event tag of the objects only in a case where a predesignated specific event has occurred, and outputting event tagging information or an event tag list for each of the objects;

an action generating step of classifying a combination of the events tagged according to each of the objects according to event conditions for recognizing a specific situation specified in advance based on object-specific event tagging information or a tagged event list received from an event tagging unit, and generating an action assigned to each combination of the events that are classified and tagged, and outputting an action to an action execution unit; and an action executing step of receiving an action from an action generation unit and performing the allocated action or displaying a result of the allocated action on a display or an external device, thereby performing complex situation recognition for at least one of the objects.

14. The method for perceiving the event tagging-based situation of claim 13, wherein the event tagging unit receives event configuration data from an event design unit and receives the location information for each of the objects from the object tracking unit, and designates a line and an area for event occurrence, the line is configured by a first combination of a straight line or a curved line, and the area is configured in a closed form by a second combination of the straight line and the curved line.

15. The method for perceiving the event tagging-based situation of claim 13, wherein the event tagging unit adds an event type and an event occurrence time to object information of a generated object whenever the objects pass through a point at which the event occurs.

16. The method for perceiving the event tagging-based situation of claim 13, wherein the predesignated event includes one or more of generation of a new object, disappearance of at least one of the objects, passing through a designated line, entering a designated area, and exiting from the designated area to outside the designated area.

17. The method for perceiving the event tagging-based situation of claim 13, wherein the event tag is one or more of an event identification that has occurred for each of the objects, a type of the event that has occurred, and a time value at which the event has occurred.

18. The method for perceiving the event tagging-based situation of claim 13, wherein the action generation unit receives an event condition and action configuration data for perceiving a specific situation from an action definition unit and receives the event tagging information or the event tag list for each of the at least one object from the event tagging unit.

* * * * *